Jan. 1, 1929.

L. BLACKMORE

LAMP

Filed Jan. 5, 1923

Inventor

Lloyd Blackmore

Jan. 1, 1929.

L. BLACKMORE 1,697,804

LAMP

Filed Jan. 5, 1923 2 Sheets-Sheet 2

Inventor

Lloyd Blackmore

Patented Jan. 1, 1929.

1,697,804

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

LAMP.

Application filed January 5, 1923. Serial No. 610,801.

This invention relates to lamps such as are used for automobiles and other vehicles, and is illustrated as embodied in several differently modified forms, each of which is adapted for use as a combination tail lamp and warning signal.

An object of the invention is to provide an efficient device of this character which will be relatively inexpensive to manufacture and which will be highly compact in construction.

With this object in view, one form of the invention contemplates the use of driver-operated means such as a shutter for controlling the transmission of light from a suitable source, shown as an electric lamp so that the light will serve as a warning signal, as, for example, when the vehicle is slowed up or stopped. The shutter may be operated by separate means, but would usually be connected to the brake, as is customary with such signals.

While not so limited as to some features, this arrangement is especially adapted for use when the same lamp serves as a tail light, the light traveling in angularly related paths, constituting one beam shining continuously as a tail light and another shutter-controlled beam serving as a warning signal. It is convenient also to provide a third path for the light to provide a beam which illuminates the number plate.

To avoid the necessity of burning the lamp continuously during daylight hours, I place in its circuit a switch arranged to be closed when the shutter is opened. In one form of the invention the movable switch member is connected to the shutter to be operated synchronously therewith. When the lamp is also used as a tail light, a second switch is preferably arranged to be manipulated to close the lamp circuit continuously after dark, regardless of the position of the shutter. In one simple and satisfactory arrangement this second switch is placed in the main lamp circuit, and the shutter-controlled switch is placed in a shunt circuit around the second switch, so that each switch is in operation entirely independent of the other. The change in resistance brought about by closing both switches when the warning signal is illuminated after dark is small enough to be ignored as a practical consideration.

In another form of the invention two lamps are used, one above the other, a tail-light glass being placed before one lamp and a warning glass before the other.

In either form, according to another feature of the invention, the warning glass and a frame carrying the tail-light glass are placed edge to edge in a peripheral supporting portion formed about the open front face of the lamp casing. In the illustrated arrangement the casing is formed with a peripheral channel in which the warning glass and the frame are seated, the frame being arranged to support the free edge of the warning glass. I prefer to strengthen the free edge of the frame by a bracket connecting it to the casing, to which it may quite readily be clamped by the lamp socket, if desired. Such a bracket forms a rigid and highly satisfactory support for the above-described shutter. It should be noted, moreover, that this frame, together with its bracket and with or without the shutter, itself presents substantial novelty as pointed out in some of the appended claims.

The above and other features of the invention, including certain novel combinations and various desirable specific constructions, will be apparent from the following description of the embodiments of the invention shown in the accompanying drawings, in which.

Figure 2:
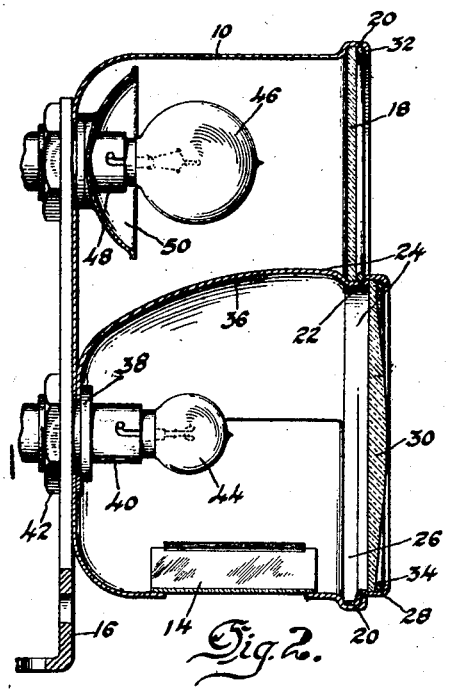
Fig. 2 is a section through the lamp on the line 2—2, Fig. 1.
Figure 1:
Fig. 1 is a front elevation of one form of lamp.
Figure 3:
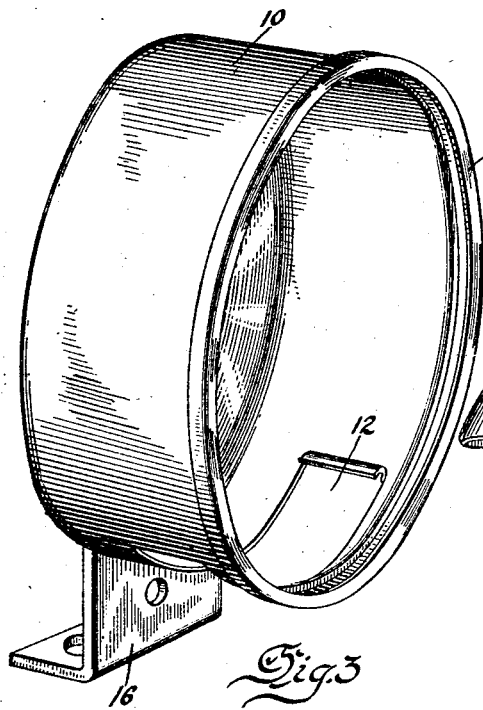
Fig. 3 is a perspective view of the casing.
Figure 4:
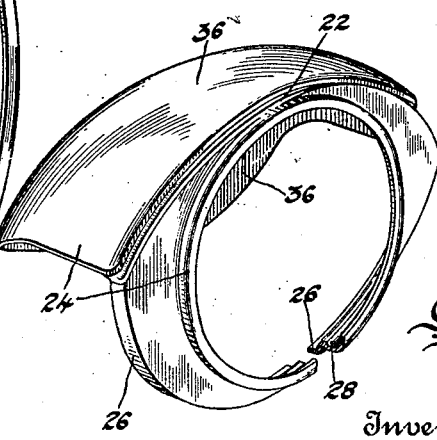
Fig. 4 is a perspective view of the frame member.
Figure 5:
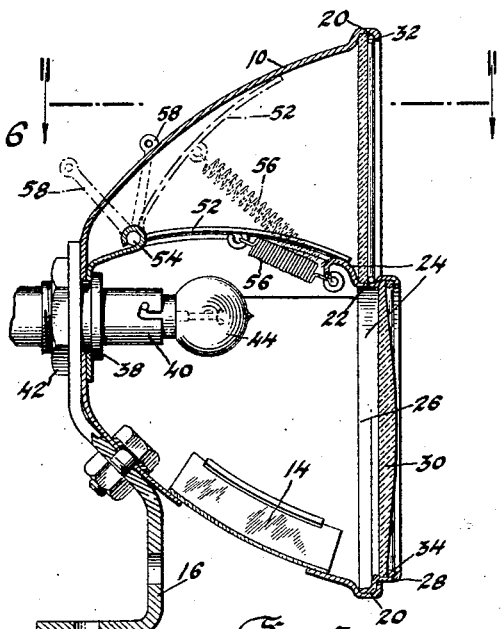
Fig. 5 is a section corresponding to Fig. 2, showing a modified construction.
Figure 7:
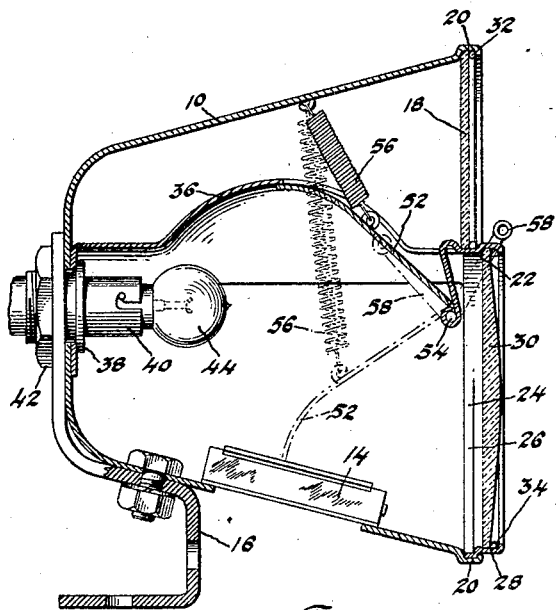
Fig. 7 is a section corresponding to Figs. 2 and 5, showing a differently modified construction.

The elements common to the various modifications include a casing 10, formed with an opening 12 for a glass 14 arranged to illuminate a number plate, and arranged to be attached to a vehicle by a suitable bracket 16. The casing may take various forms, as shown in Figs. 2, 5 and 7. A warning glass 18, suitably stenciled as shown, is seated in part of a peripheral channel 20, and is supported at its free edge in a channel 22 formed in the free edge of a frame 24, one form of which is shown in Fig. 4, and which is formed with a flange 26 seating in the remainder of channel 20 of the casing. This frame is formed with an opening surrounded by a further channel 28 in which a tail-light glass or lens 30 is supported. Glasses 18 and 30 are retained in place by spring wires 32 and 34 respectively.

To hold the frame rigidly in place, it is formed with a transversely-extending bracket 36, which may conveniently be clamped to the rear face of the casing by a flange 38 on the bulb socket 40 which is secured in place by a locking nut 42. Socket 40 carries a bulb 44, which serves as the tail lamp in the modification shown in Figs. 1–4, and as both tail lamp and warning signal lamp in the other modifications.

In the first modification a second bulb 46, seated in a socket 48 and provided with a reflector 50, serves as a warning signal lamp.

Figure 6:
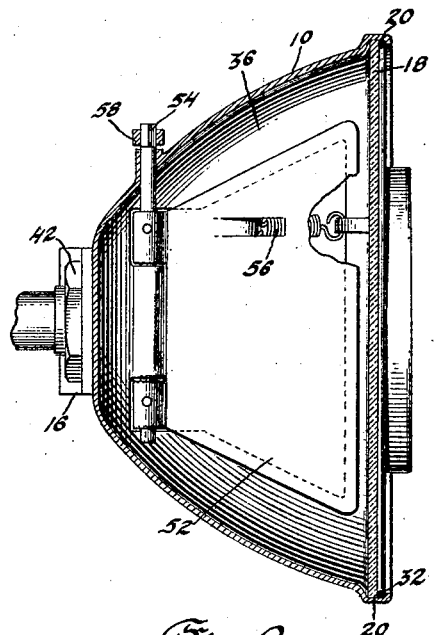
Fig. 6 is a section through the modified lamp on line 6—6, Fig. 5.

In the modification shown in Figs. 5 and 6, a shutter 52 is secured to a shaft 54 carreid by bracket 36 in such a manner as to close an opening in the bracket between lamp 44 and warning glass 18. A spring 56 normally holds the shutter closed, and a lever 58 is secured to shaft 54 for opening the shutter. Lever 58 is manipulated by suitable driver-controlled connections, ordinarily from the brake lever, although a separate controlling device may be provided if desired. Shutter 52 may be polished to serve as a reflector in directing light from lamp 44 through glass 18.

The modification shown in Fig. 7 differs from that shown in Figs. 5 and 6 in that the shutter 52 is opened by swinging it downwardly.

Figure 8:
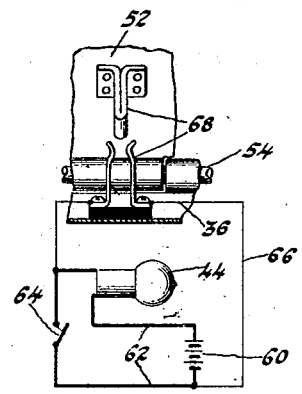
Fig. 8 is a view, partly in section and partly in diagram, showing one arrangement of electric connections for the modified lamps.

The circuit which I prefer to use is shown in Fig. 8, and comprises a battery or other source of current 60, and a main circuit 62 including a switch 64, which may be mounted if desired on the instrument board. This switch is closed after dark, when lamp 44 is to burn continuously as a tail light. A shunt circuit 66 is arranged around switch 64, and includes a second switch 68 connected to shutter 52 through shaft 54 in such a manner as to be closed whenever the shutter is opened. During daylight, when no tail light is needed, switch 64 is turned off, and switch 68 controls lamp 44, causing it to burn only when shutter 52 is open.

The operation of the lamp will be clear from the above description. When switch 64 is off, warning glass 18 is illuminated when the shutter is opened by closing switch 68. When switch 64, is closed the closing of switch 68 in this manner only serves to diminish the resistance slightly, circuits 62 and 66 being then in parallel.

While several particular forms of the invention have been described, it is not my intention to limit its scope to these forms or otherwise than by the terms of the appended claims.

The members 18 and 30 have been referred to as glasses or lens. It is to be understood that so far as this invention is concerned these terms are used to cover transparent media of any preferred composition and of any desired color. It is also to be understood that the media may bear any suitable inscription or none at all if preferred. Obviously these matters are not material to the invention for in some cases the mere projection of light from the upper compartment which is normally unlighted will be sufficient to attract the desired attention and give the desired signal.

I claim:

1. A lamp and signal device comprising, in combination, a casing, a lamp socket in the casing, a glass closing one part of the front face of the casing, a frame carrying a second glass closing the remainder of said face, and a partition forming member integral with said frame, extending transversely of the casing and clamped thereto by the lamp socket to divide said casing into compartments opposite the respective glasses, said partition having an opening therein, and carrying a movable shutter over the opening controlling passage of light rays from one compartment to the other.

2. A lamp and signal device comprising, in combination, a casing channeled peripherally about its open front face, a glass fitting in and supported by part of the peripheral channel, a frame carrying a second glass, and fitting in and supported by the remainder of the peripheral channel and formed to receive and support the adjacent edge of said first mentioned glass, a partition forming member integral with the frame, secured to and extending transversely of the casing to divide the casing into two compartments, a source of illumination within one compartment and a shutter over the opening in the partition, operable to permit light rays to enter the other compartment.

3. A lamp and signal device comprising, in combination, a casing channeled peripherally about its open front face, a glass fitting in and supported by part of the peripheral channel, a frame carrying a second glass fitting in and supported by the remainder of the peripheral channel and formed with a channel to receive the adjacent edge of said first mentioned glass, said frame having an integral partition forming part dividing the casing into compartments opposite the respective glasses, a source of light in one compartment, and a shutter over an opening in the partition and operable to permit light rays to reach the other compartment.

4. The combination of a lamp casing having an open end, a glass for closing a portion of said open end, a unitary member having an aperture for receiving a second glass, the lower portion of said member engaging the lower portion of the open end of said casing, and the upper portion of said member being formed with a seat to receive a portion of the periphery of said first named glass, the upper portion of said member being provided with a partition forming member secured to the rear wall of said casing, a source of illumination on one side of the partition and a shutter closing an opening in the partition and operable to open position to permit light rays to pass from one side of the partition to the other.

5. A lamp and signal device including in combination a casing, having an open end, a lens supporting member comprising a portion exending transversely of the casing to partition the casing into two compartments and a portion extending over the open end of the casing in front of one of the compartments and provided with an opening, a lens carried by said portion and disposed over the opening, a lens in front of the other compartment at the open end of the casing, a source of illumination in one compartment and a movable shutter portion controlling the admission of light rays to the other compartment.

6. An integral lens support and partition wall for lamps including two portions extending substantially at right angles to each other, one portion being adapted to extend transversely of a lamp casing to partition the casing into two compartments, the other portion being adapted to extend over the open end of the casing in front of one compartment, and being provided with an opening therein and having means for supporting a glass over said opening.

7. The structure of claim 6 wherein one portion is provided with means which cooperates with the casing to support a glass over the other compartment.

8. The structure of claim 6 wherein one portion is provided with means which cooperate with the casing to support a glass over the other compartment and carries a movable shutter controlling the passage of light rays from one compartment to the other.

9. A lamp and signal device comprising, in combination, a casing, a warning glass closing one part of the front face of the casing, a frame carrying a tail light glass closing the remainder of said face, and partition forming member extending to the rear face of the casing and dividing the casing into compartments opposite the respective glasses, a source of illumination within the tail light compartment and a movable shutter over an opening in the partition to permit light rays to reach the warning glass.

In testimony whereof I affix my signature.

LLOYD BLACKMORE.